United States Patent

Eklof et al.

[11] Patent Number: 6,058,147
[45] Date of Patent: May 2, 2000

[54] INTELLIGENT CARRIER ACQUISITION METHOD FOR SATELLITE COMMUNICATIONS

[75] Inventors: Anders Eklof, Poolesville; Chester Joseph Wolejsza, Jr., Gaithersburg, both of Md.

[73] Assignee: Telogy Networks, Inc., Germantown, Md.

[21] Appl. No.: 08/810,657

[22] Filed: Mar. 3, 1997

[51] Int. Cl.[7] .................................................. H04L 27/06
[52] U.S. Cl. ......................... 375/344; 455/12.1; 455/427
[58] Field of Search .................................. 375/344, 326; 455/12.1, 427, 504, 505, 266

[56] References Cited

U.S. PATENT DOCUMENTS

| | | | |
|---|---|---|---|
| 4,691,176 | 9/1987 | Hsiung et al. | 331/2 |
| 5,323,164 | 6/1994 | Endo | 342/357 |
| 5,365,450 | 11/1994 | Schuchman et al. | 364/449 |
| 5,379,320 | 1/1995 | Fernandes et al. | 375/1 |
| 5,432,521 | 7/1995 | Siwiak et al. | 342/357 |
| 5,450,447 | 9/1995 | Dutta | 375/344 |
| 5,471,657 | 11/1995 | Gharpuray | 455/12.1 |
| 5,477,458 | 12/1995 | Loomis | 364/449 |
| 5,481,561 | 1/1996 | Fang | 375/205 |
| 5,579,345 | 11/1996 | Kroeger et al. | 375/344 |
| 5,768,323 | 6/1998 | Kroeger et al. | 375/355 |

*Primary Examiner*—Stephen Chin
*Assistant Examiner*—Mohammad Ghayour
*Attorney, Agent, or Firm*—Roberts & Abokhair, LLC

[57] ABSTRACT

A narrow band RF carrier acquisition method suitable for Demand Assigned Multiple Access (DAMA) networks having multiple narrow band carriers operating with channel frequency spacing that may be less than the frequency uncertainty on the link. The present invention uses a variable database of active narrow band carrier frequency assignments for the ground stations in the system, which, together with a knowledge of the approximate magnitude of the frequency errors, can be exploited to allow a receiving ground station to optimize the process of narrow band carrier frequency acquisition. The optimization employs alternative procedures depending upon different acquisition circumstances, thereby allowing the receiving ground station to utilize the optimal acquisition method under any given set of circumstances, where the circumstances are individual and changing for each ground station in the system but are known and communicated from a system database. The intelligent narrow band carrier acquisition method makes use of a modem design in which the modem functions are largely carried out by digital technology, with most operating parameters rapidly variable through software commands.

20 Claims, 12 Drawing Sheets

1. INITIAL STATE AT START OF FIRST ACQUISITION ATTEMPT:

2. LOOP PULLED TOWARD THE WRONG CARRIER:

**3. RESTART LOOP AT $-0.43*\Delta f_{max}$:**

INTELLIGENT CARRIER ACQUISITION METHOD FOR SATELLITE COMMUNICATIONS

FIELD OF THE INVENTION

The present invention addresses the problem of how a receiving station can most efficiently and quickly acquire the correct narrow band frequency (RF) carrier from a transmitting station, in a satellite communications environment where the frequency uncertainty on a link may be small, moderate, or large. Specifically, the present invention is a narrow band carrier acquisition method that is suitable for Demand Assigned Multiple Access (DAMA) networks having multiple narrow band carriers operating with channel frequency spacing that may be less than the frequency uncertainty on the link. The present invention employs a flexible software-based approach whereby a receiving station can lock on to the correct narrow band carrier by automatically and dynamically employing the best one of three separate acquisition submethods, depending on the magnitude of the frequency uncertainty.

BACKGROUND OF THE INVENTION

The drive for lower cost satellite links has spurred the development of low bit rate voice coding, allowing the transmission of voice over low powered, narrow band carriers. The narrow band carriers must be spaced closely together in the frequency spectrum to effectively utilize satellite power and bandwidth. Consequently, any frequency errors introduced in the terrestrial and satellite hardware can then cause receiving stations substantial difficulty in finding and locking on to the correct narrow band carrier. The frequency error for a ground station attempting to lock to a narrow band carrier may be much greater than the spacing between the narrow band carriers, causing several narrow band carriers to fall within the band of frequency uncertainty. The frequency uncertainty of the received narrow band carrier typically is caused by the following five separate and independent contributing factors:

1. Frequency reference (local timebase) error in the transmitting ground station.

2. IF to RF frequency translation error in the transmitting ground station.

3. Uplink to downlink frequency translation error in the satellite.

4. RF to IF frequency translation error in the receiving ground station.

5. Frequency reference (local timebase) error in the receiving ground station.

Satellite Doppler effects may also contribute, but the contribution is normally negligible with geostationary satellites—the category of satellites to which the present invention is addressed.

The five factors above are briefly discussed in turn. First, the frequency reference (local timebase) and IF to RF frequency translation errors in the transmitting station may be significant, affecting its carrier uniquely and specifically. Second, the uplink to downlink frequency translation error in the satellite has in the past been the dominant factor, amounting to as much as tens of kilohertz. This error affects all the ground stations transmitting through the same satellite, and shows up as a shift of the whole received spectrum. System control stations can now compensate for this shift with reasonable accuracy by measuring the translation shift and using this information to adjust narrow band frequency assignments, or use other means to compensate for this error to reduce the frequency errors in the assigned narrow band carriers as received by each ground station. Third, the RF to IF frequency translation and frequency reference (local timebase) errors in the receiving station may also be significant, affecting all the received narrow band carriers by the same amount.

These five factors combine to create a net error which can cause the desired narrow band carrier to fall outside the bandwidth in which the receiver is searching, thereby preventing the receiving station from locking on to the transmitting station's frequency. In extreme cases, another narrow band carrier with the same symbol rate and modulation type may be present in the bandwidth in which the receiver is searching, causing the receiver to lock to the wrong narrow band carrier. Acquisition performance is measured by (i) the probability of successful acquisition (ii) the risk that the receiver locks on to the wrong narrow band carrier with no automatic means to break lock and resume the search for the correct narrow band carrier, and (iii) how quickly the correct narrow band carrier is acquired. The five error factors enumerated above all must be addressed in order to achieve optimal acquisition performance. Current methods of addressing the above factors require making design trade-offs in certain fixed parameters related to narrow band carrier acquisition, which result in reasonable performance. However, maximum performance cannot be achieved because the same acquisition scheme is being used regardless of the size of the shift caused by the net error. Further, the receiving station must be designed specifically to acquire a narrow band carrier in a spectrum of other narrow band carriers, which prevents the receiving ground station from employing fast, wide band carrier acquisition methods.

Within the prior art, various compensation techniques are disclosed in an attempt to reduce frequency uncertainty or reduce signal acquisition time. As an example, U.S. Pat. No. 5,471,657, issued to Archana M. Gharpuray is directed to a tuning system for satellite ground stations, and a method to compensate for offsets in transmission frequency used by ground stations. A stated object of '657 is to allow "a large number of remote ground stations to compensate for offsets and drift in a bursty satellite communications network without consuming communications bandwidth and without adding to the cost of the remote terminals." The technique of '657 relies on measurement of the relative frequency offset of signals through the satellite, and provides that information from a network control station to remote terminals in the satellite communication network. While this technique does allow the remote terminals to more readily acquire the received signals, '657 does not disclose techniques for rapid signal acquisition in widely varying circumstances. As examples, when there are interfering narrow band signals within the frequency uncertainty, or when the narrow band frequency uncertainty is larger than the narrow band acquisition window.

In another example, U.S. Pat. No. 5,481,561, issued to Russell J. Fang, is directed to techniques for use of CDMA in a DAMA manner to support bursty point-to-point communications between small user communications networks, while conserving bandwidth. The frequency compensation technique of the network control station of '561 uses a precise oscillator with long term stability to send a continuous wave (CW) pilot through the satellite, then watches for the return tone. The network control station then corrects for frequency errors by adjusting the frequency of the transmitted pilot so that the received CW signal is at a precise desired frequency in the center of the downlink frequency band. The remote stations use this corrected pilot for satellite acquisition and tracking. This technique provides for compensation of errors in the satellite, but '561 does not disclose a technique to compensate for errors in the individual uplink and downlink stations, nor does the technique of '561 disclose a technique for rapid acquisition without a pilot tone or with interfering signals within the frequency uncertainty, or when the narrow band frequency uncertainty is larger than the narrow band acquisition window.

As another example, U.S. Pat. No. 5,365,450, issued to Leonard Schuchman et al. is directed to a method to enable rapid and accurate measurement of position, and more particularly to global position system (GPS) precise position location in urban canyon or sight obstructed environments. Included within the specification and disclosure of '450, is a technique to resolve frequency uncertainty in the GPS signals and thereby reduce the time required to develop an accurate position. The frequency measurement from tracking a first satellite is used to calibrate and remove the frequency bias of the GPS local oscillator. This technique allows search of a single frequency cell to achieve rapid subsequent acquisition of other GPS signals. A principal advantage of '450 for GPS acquisition is the use of the frequency bias information from the first satellite to narrow the search band for subsequent channels. This technique of '450 does not disclose a system that is adaptable to satellite communication systems that only require acquisition of a single narrow band channel. The technique of '450 is relevant for satellite systems in non-geosynchronous orbit with significant Doppler components. However, conventional satellite communication systems generally use satellites in geosynchronous orbit with minimal Doppler.

The prior art and known techniques make design trade-offs in the selection of fixed operating parameters or rely on highly precise narrow band carrier frequency control to acquire the correct narrow band carrier. None of the prior art and known techniques provide a dynamically changing acquisition method to adapt to the circumstances of the specific narrow band carrier acquisition provide an ability to adapt or select acquisition methods based on differing conditions.

SUMMARY OF THE INVENTION

In a satellite DAMA network, there exists a variable database of active narrow band carrier frequency assignments for the ground stations in the system. In the present invention, this system database, together with a knowledge of the approximate magnitude of the frequency error is exploited to allow a receiving ground station to optimize the process of narrow band carrier frequency acquisition, by employing different acquisition procedures in different acquisition circumstances. In essence, by employing dynamic flexibility or intelligence in the acquisition process, the present invention allows the receiving ground station to use an optimal acquisition method in any given set of circumstances, where the circumstances are individual and changing for each ground station in the system, but are known and communicated from the system database.

The present invention employs an intelligent narrow band carrier acquisition method by an improved modem design in which the demodulator functions are largely carried out by digital technology, allowing most operating parameters to be varied rapidly through software commands. Among others, these operating parameters include the following: narrow band carrier frequency; filter band-widths and roll-off factors; symbol rate; and modulation format. In the preferred embodiment, the communication operating parameters comprise the carrier frequency of the desired communication channel, carrier frequency uncertainty of the desired communication channel; operating parameters of other communication channels within the frequency acquisition range, bandwidth of the desired communication channel, symbol rate of the desired communication channel, modulation type of the desired communication channel, and coding rate of the desired communication channel.

It is therefore an object of the present invention to integrate into a common system a variety of narrow band carrier acquisition methods with individual enhancement submethods, where the choice of acquisition method and submethod is made automatically, based on the most efficient method and submethod possible in the set of narrow band carrier acquisition circumstances present at the moment.

It is a further object of the present invention to allow each ground station in a narrow band satellite communications system to lock to a received narrow band carrier in the shortest possible time, when (i) the known frequency uncertainty is less than the frequency range over which the receiver phase/frequency detection mechanism can operate without frequency ambiguity, and (ii) the known frequency uncertainty is slightly greater than the bandwidth of the narrow band carrier recovery phase lock loop.

It is a further object of the present invention to enhance the phase lock loop (PLL) acquisition performance by adding the output of a narrow band discriminator (NBD) to the output of the phase detector until a loop lock indication is obtained, when the known frequency uncertainty is greater than about half the loop bandwidth.

It is a further object of the present invention to enhance the narrow band carrier acquisition performance by the use of a wide band discriminator (WBD) for coarse frequency acquisition when (i) the known frequency uncertainty is too large for the narrow band discriminator plus phase lock loop to acquire and (ii) only if other narrow band carriers are not expected to be present in the WBD frequency range.

It is a further object of the present invention to allow the acquisition method for possible large initial frequency error to be automatically modified to avoid using the WBD if another narrow band carrier could be present in the acquisition range based (i) on the frequency assignments stored in the system database, (ii) on the maximum expected frequency uncertainty in the system, and on (iii) the bandwidth of the respective narrow band carriers.

It is a further object of the present invention to minimize the deterioration in acquisition performance caused by the presence of narrow band carriers in adjacent frequency assignment slots, where these narrow band carriers have a different symbol rate and/or FEC code rate than the desired narrow band carrier.

It is a further object of the present invention to allow the automatic rejection of lock to an adjacent narrow band carrier when such a narrow band carrier has the same symbol rate, modulation type and FEC coding as the desired narrow band carrier.

These and other objects of the present invention will become obvious to one of ordinary skill in the art after review of the detailed description, drawings, and appended claims in the entire specification of the present invention.

DETAILED DESCRIPTION OF THE PRESENT INVENTION

Definitions

Throughout the specification the following definitions apply:

Frequency Uncertainty: the maximum magnitude of the radio frequency error.

Narrow Band: radio frequency bandwidth of approximately 25 KHz or less.

Wide Band: radio frequency bandwidth of 100 KHz or greater.

Lock: center tune on the desired radio frequency with frequency tracking and signal demodulation.

IF: Intermediate Frequency, typically at a lower radio frequency than the radio frequency carrier.

System Control Station: a central ground facility with capability to modify satellite operational parameters and assign or monitor channel use by subscribing ground stations.

System Database: a compilation of operating parameters for the satellite DAMA network which is maintained at the system control station, and includes the following: narrow band carrier frequency; filter bandwidth; roll-off factors; symbol rate; and modulation format.

Narrow Band Discriminator (NBD): a means to measure the phase of the received symbols by sampling the I (In phase) and Q (Quadrature) components of the signal once per symbol time. The NBD then observes the rate of the shift of the symbol phase in consecutive symbols. This rate of shift is an indication of error in the local oscillator frequency relative to the received carrier, and the NBD output is used to steer the tunable local oscillator to the correct frequency.

Wide Band Discriminator (WBD): a quadricorrelator or any other means to rapidly find a rough measure of the frequency of a signal.

Broadcast Satellite Channel: a command and control data channel from the system control station used to pass information on the satellite DAMA network and which is typically not used for user data exchange.

FIGURES

Figure 1:
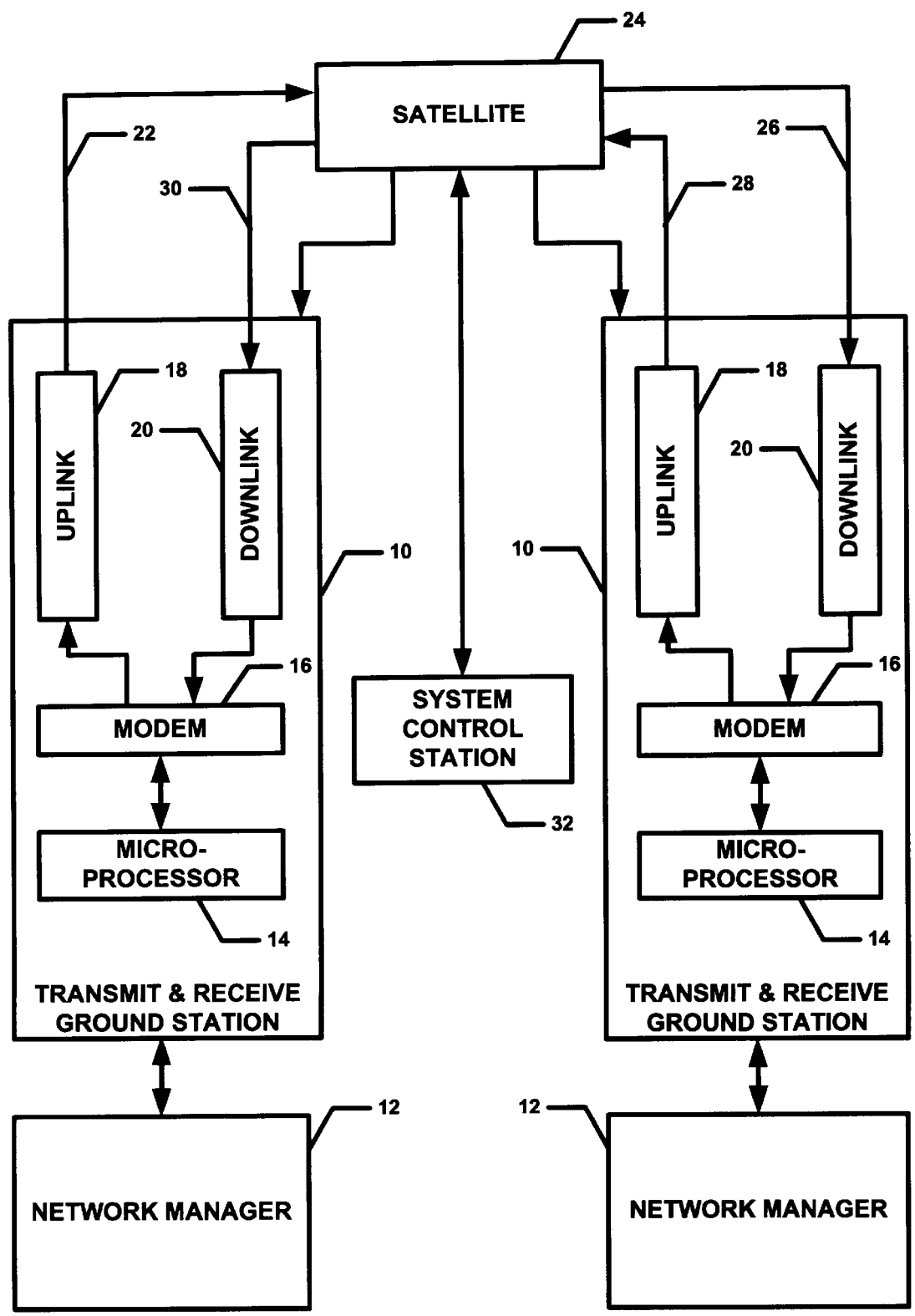

FIG. 1: Illustrates the overall architecture of the present invention.

Figure 2:
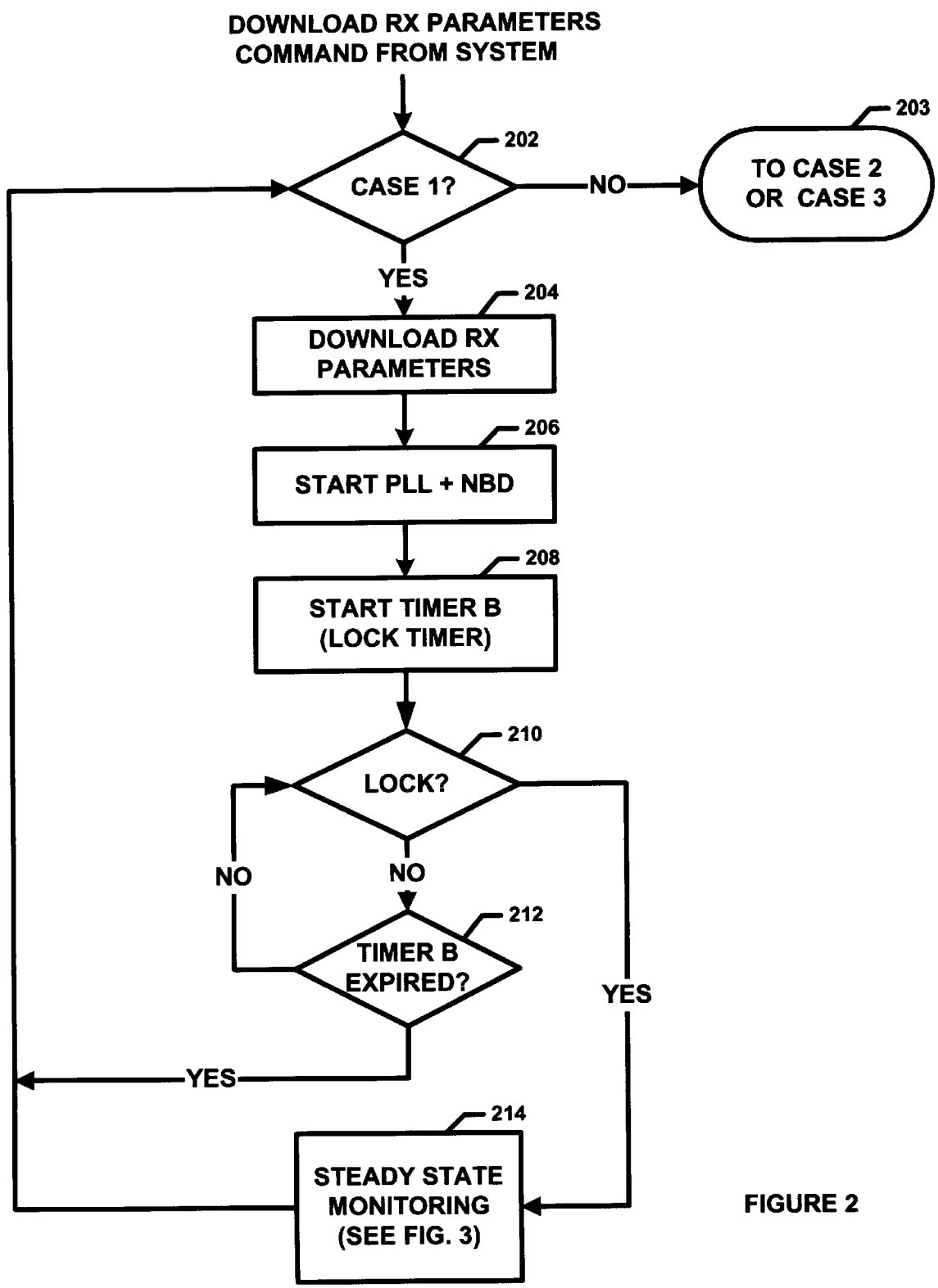

FIG. 2: Illustrates the acquisition sequence for Case 1 of the present invention.

Figure 3:
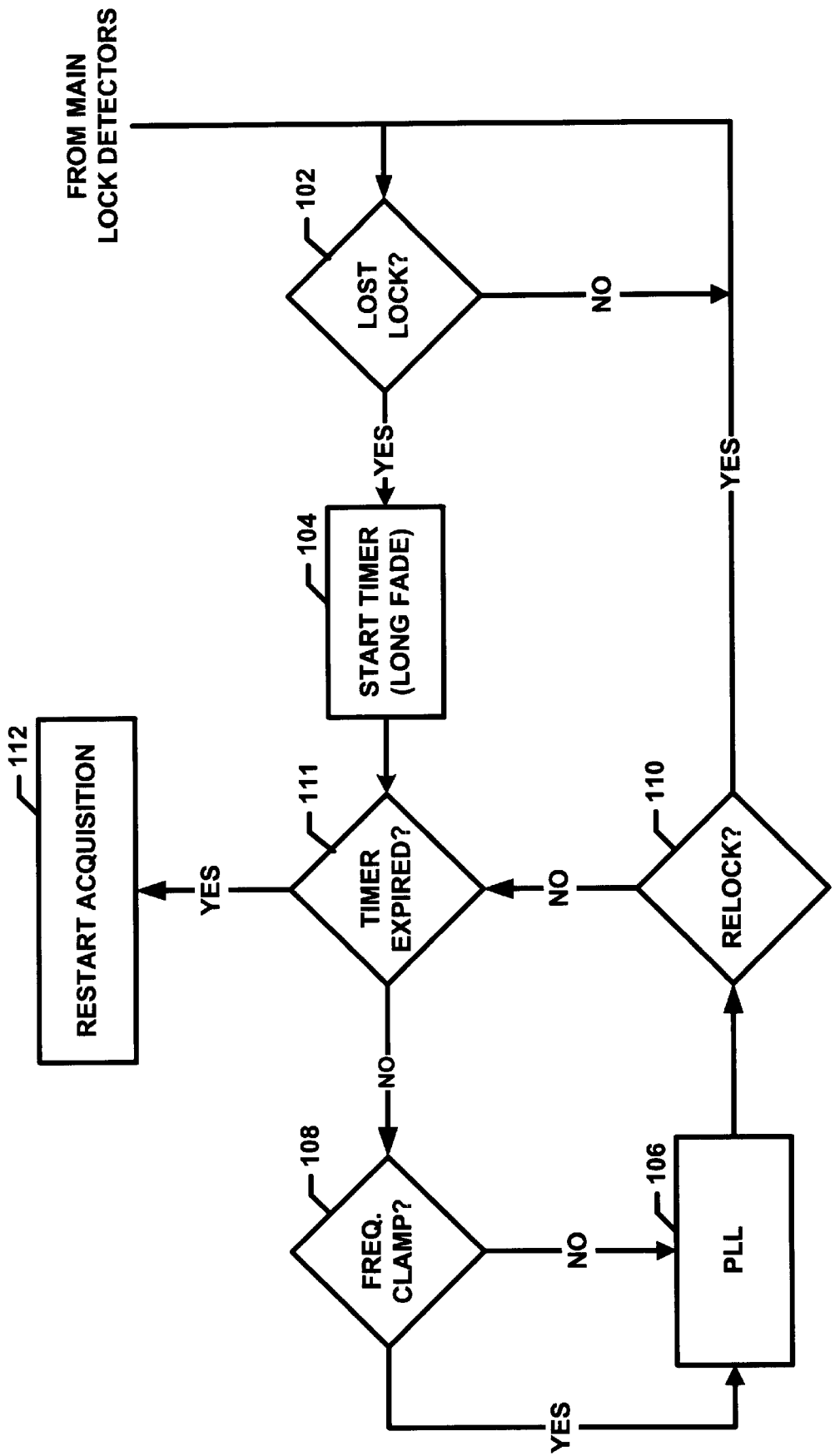

FIG. 3: Illustrates the steady state carrier loop tracking of the present invention.

Figure 4:
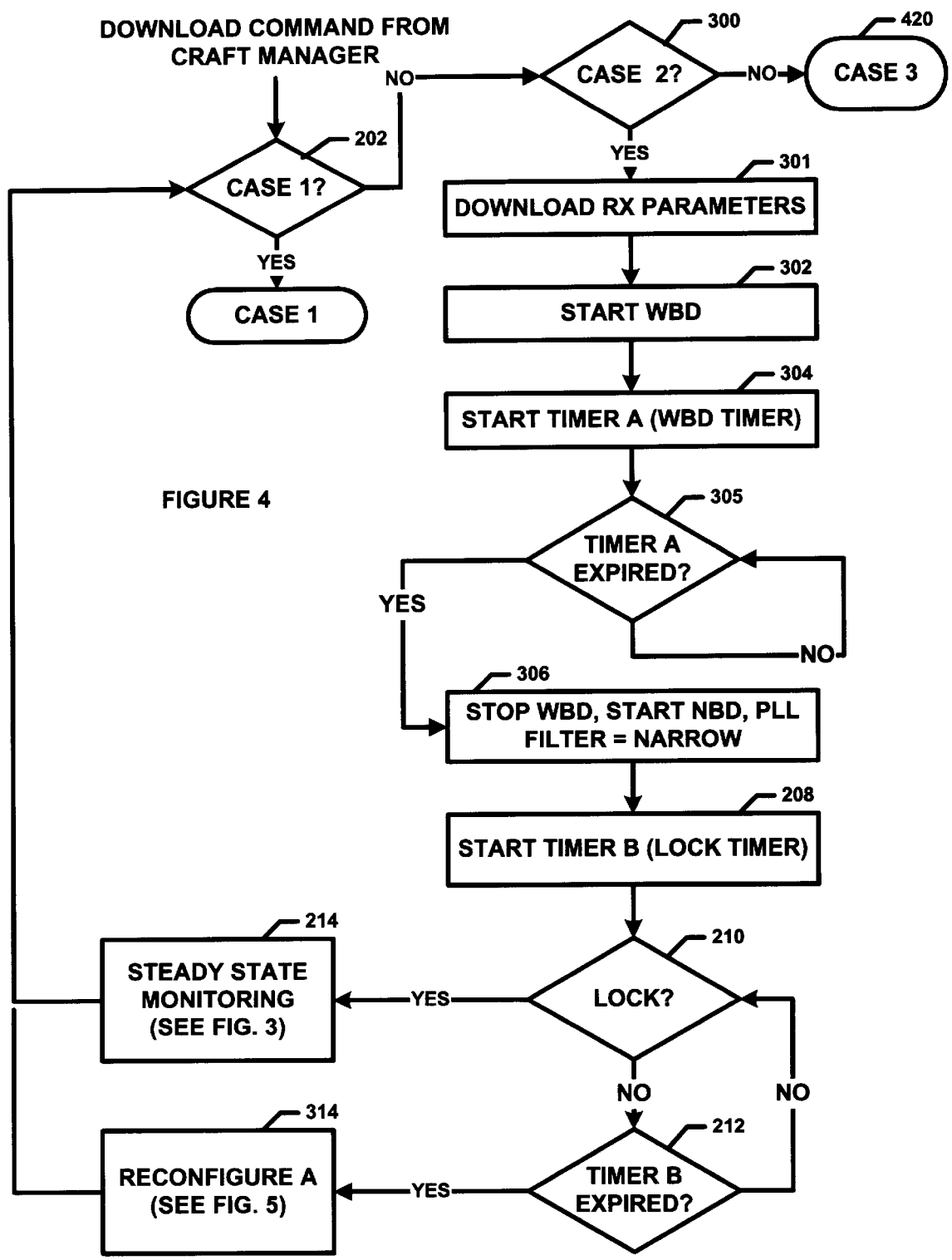

FIG. 4: Illustrates the acquisition sequence for Case 2 of the present invention.

Figure 5:
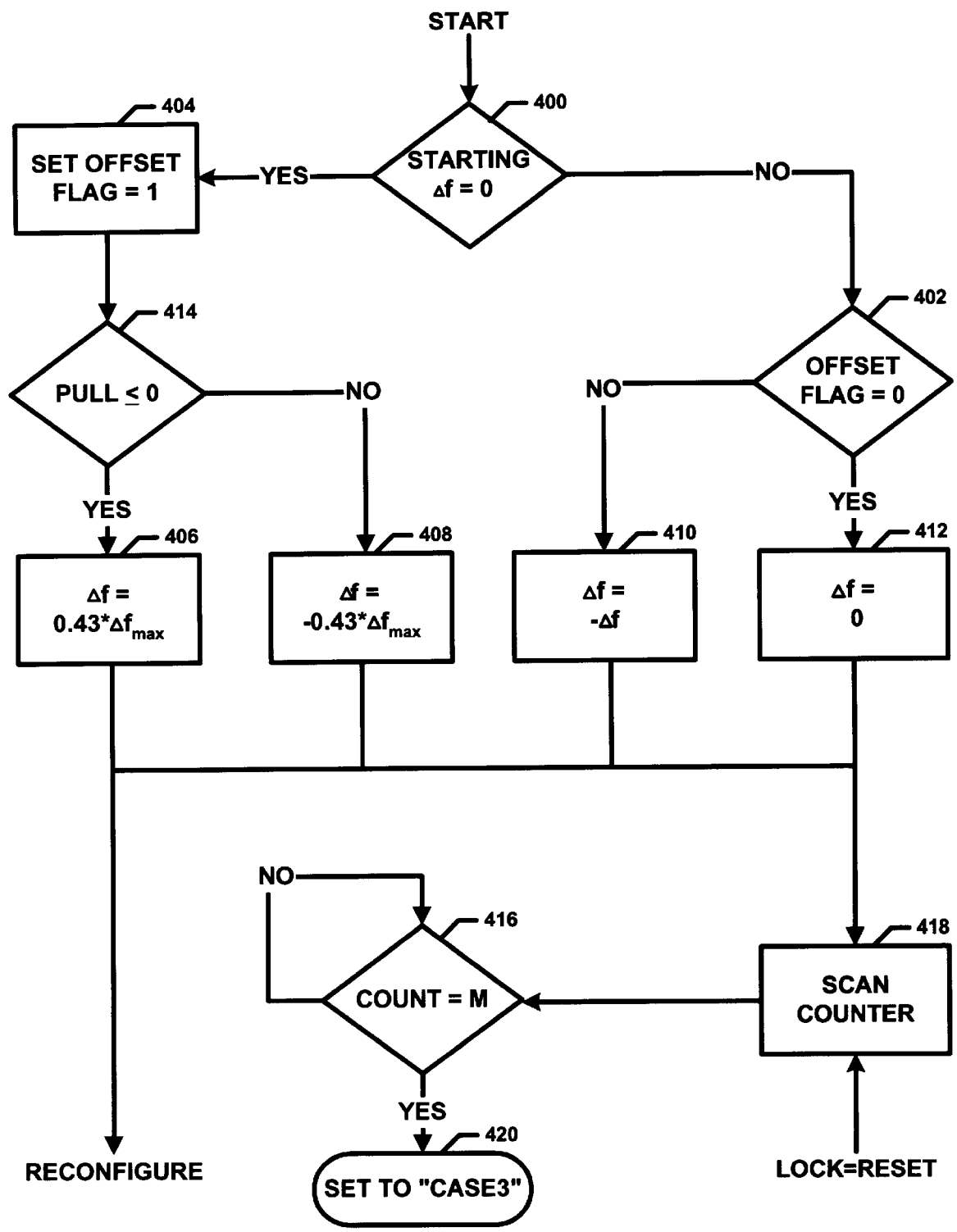

FIG. 5: Illustrates the reconfiguration "A" of the present invention.

Figure 6:
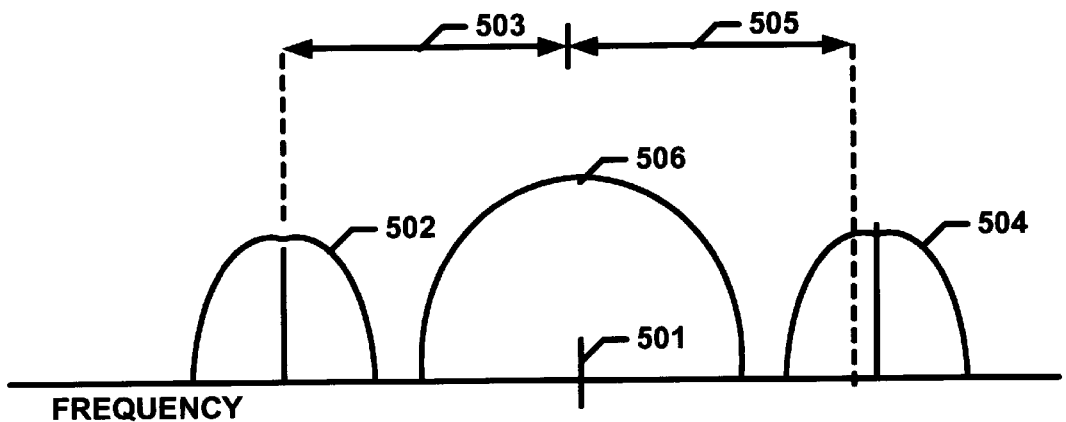
Figure 6:
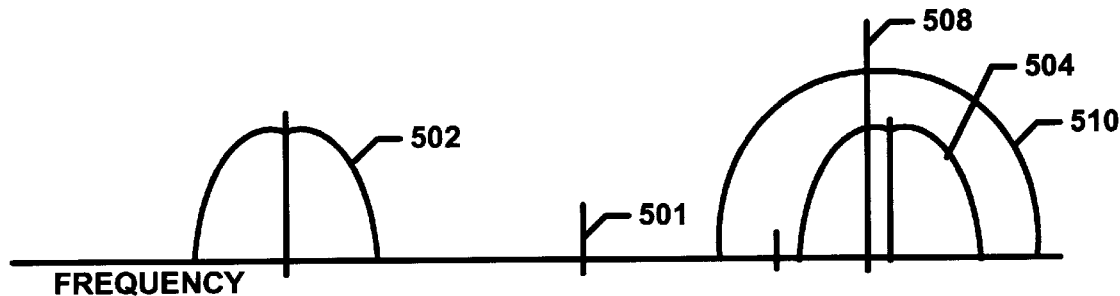
Figure 6:
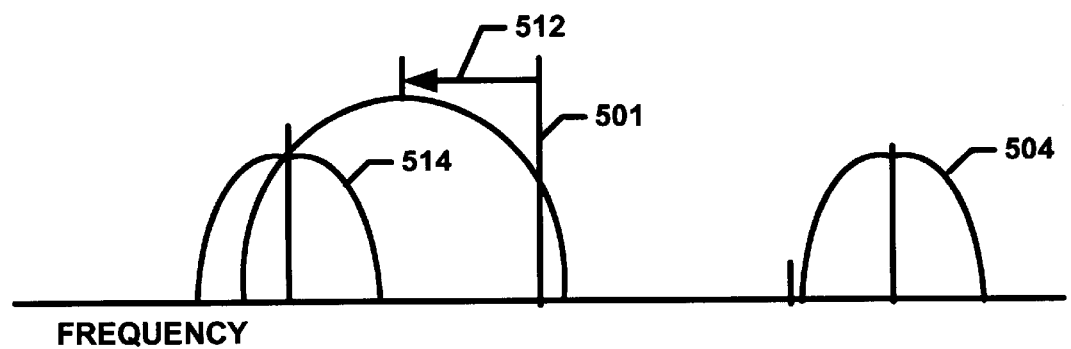

FIG. 6: Illustrates the filter bandwidth configuration with various values in reconfiguration "A" of the present invention.

Figure 7:
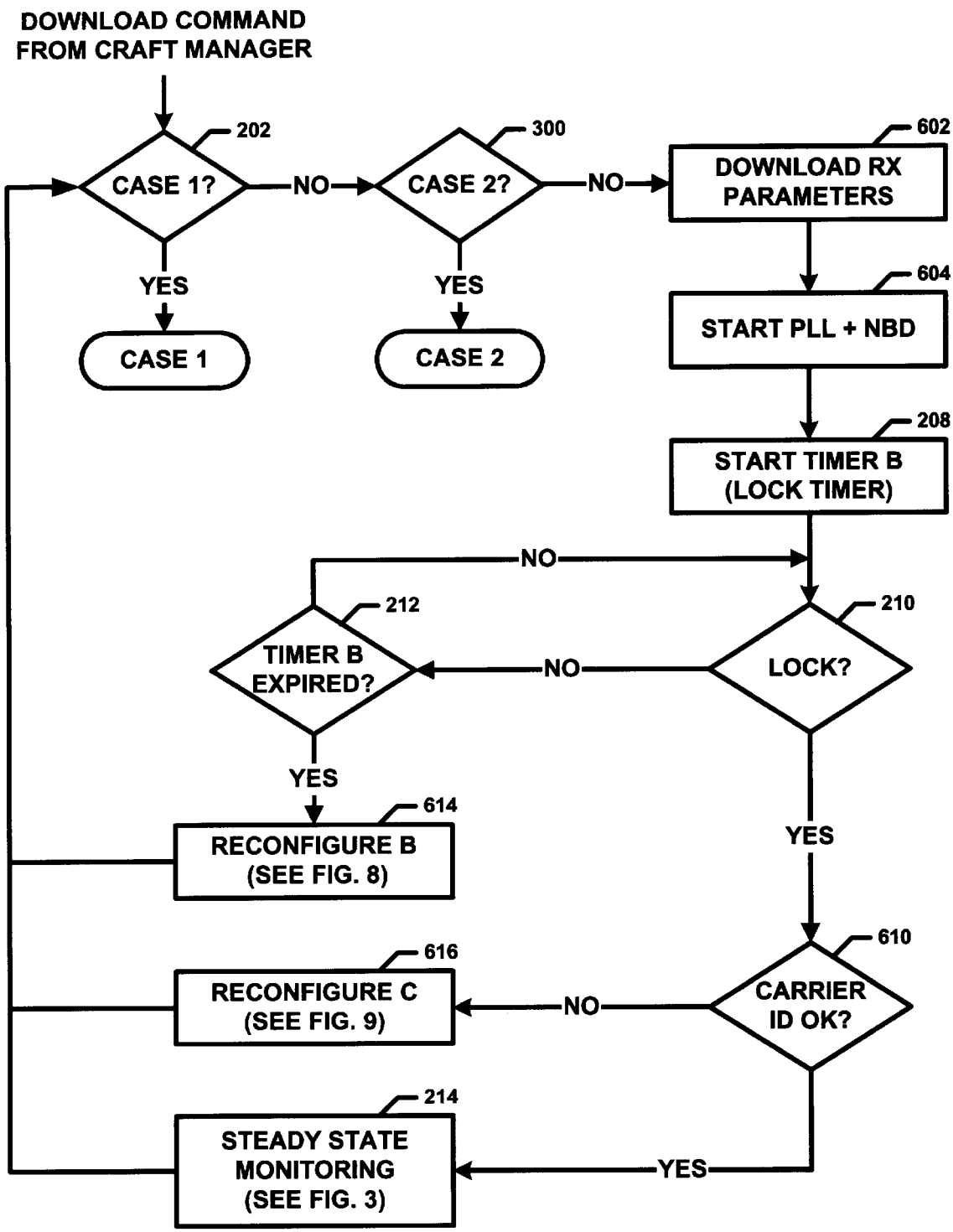

FIG. 7: Illustrates the acquisition sequence for Case 3 of the present invention.

Figure 8:
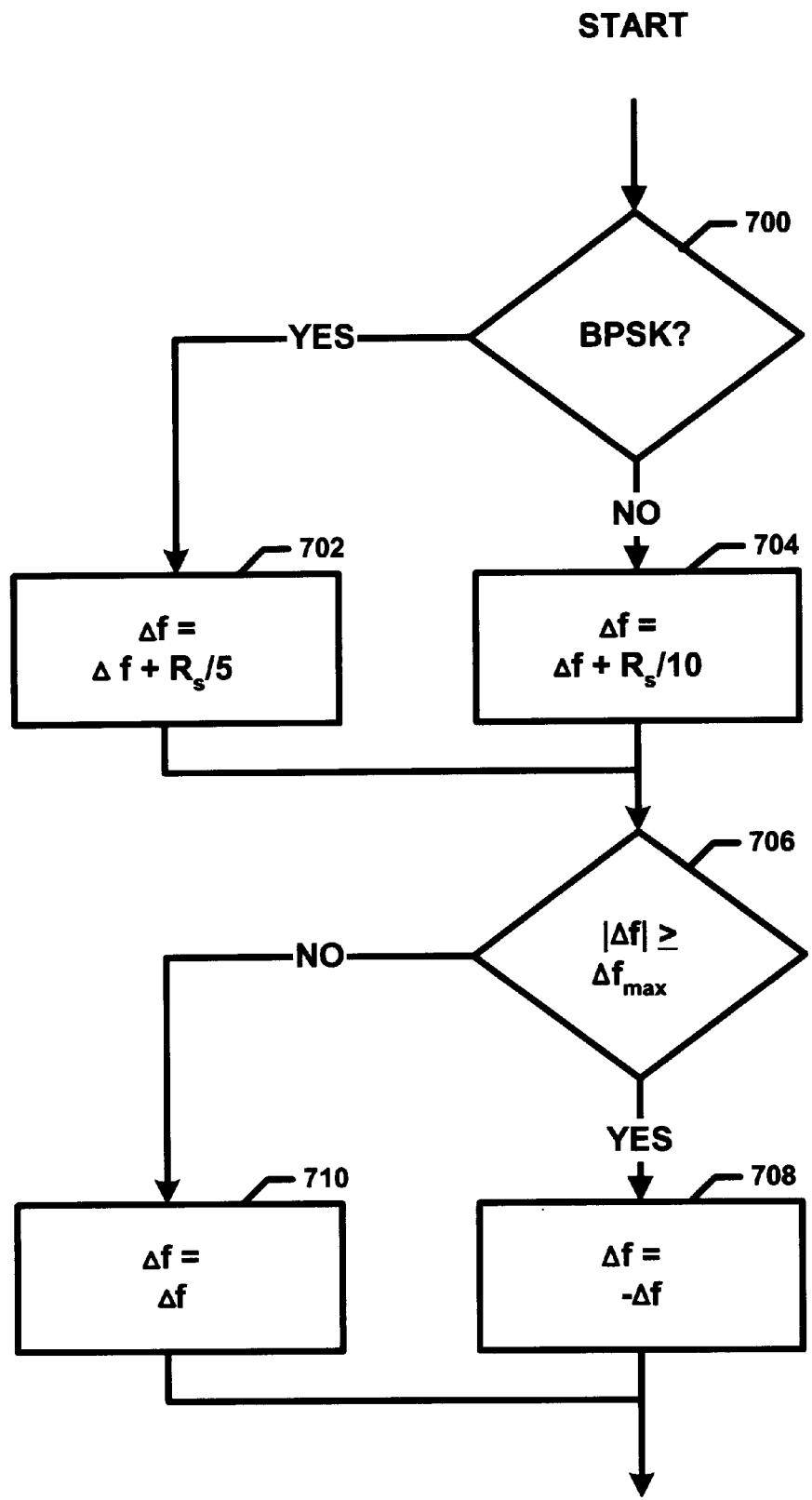

FIG. 8: Illustrates the reconfiguration "B" of the present invention.

Figure 9:
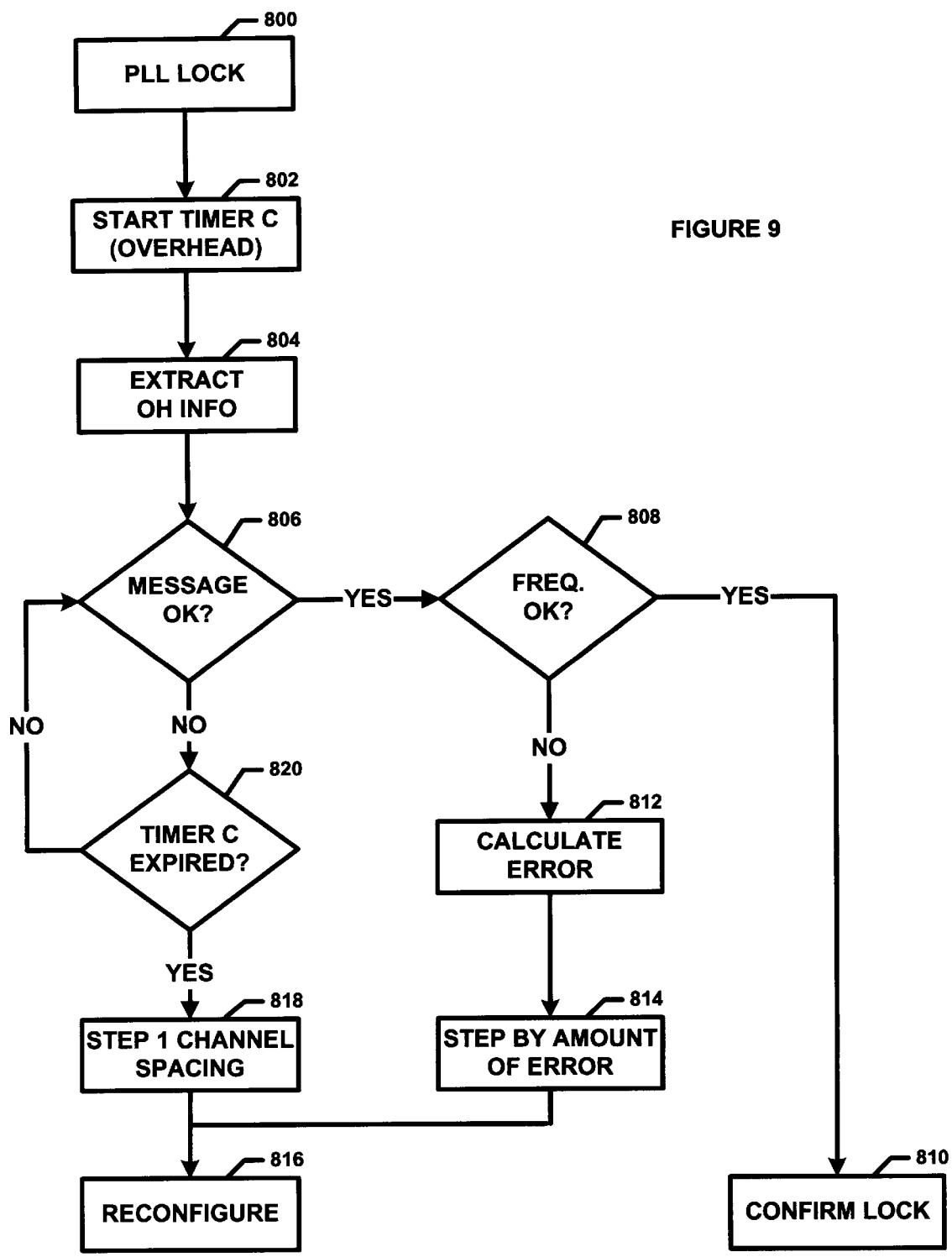

FIG. 9: Illustrates the reconfiguration "C" of the present invention.

Figure 10A:
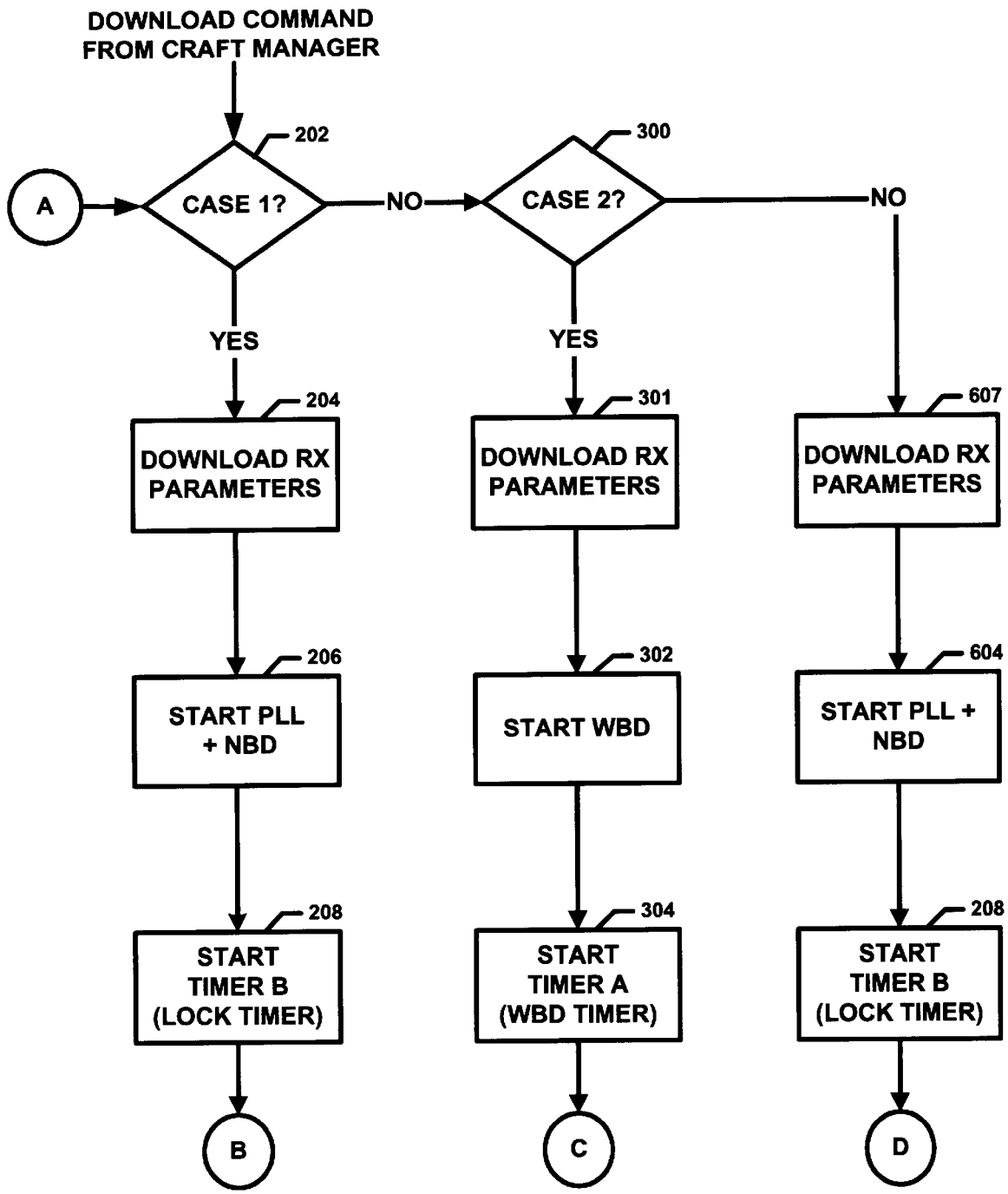
Figure 10B:
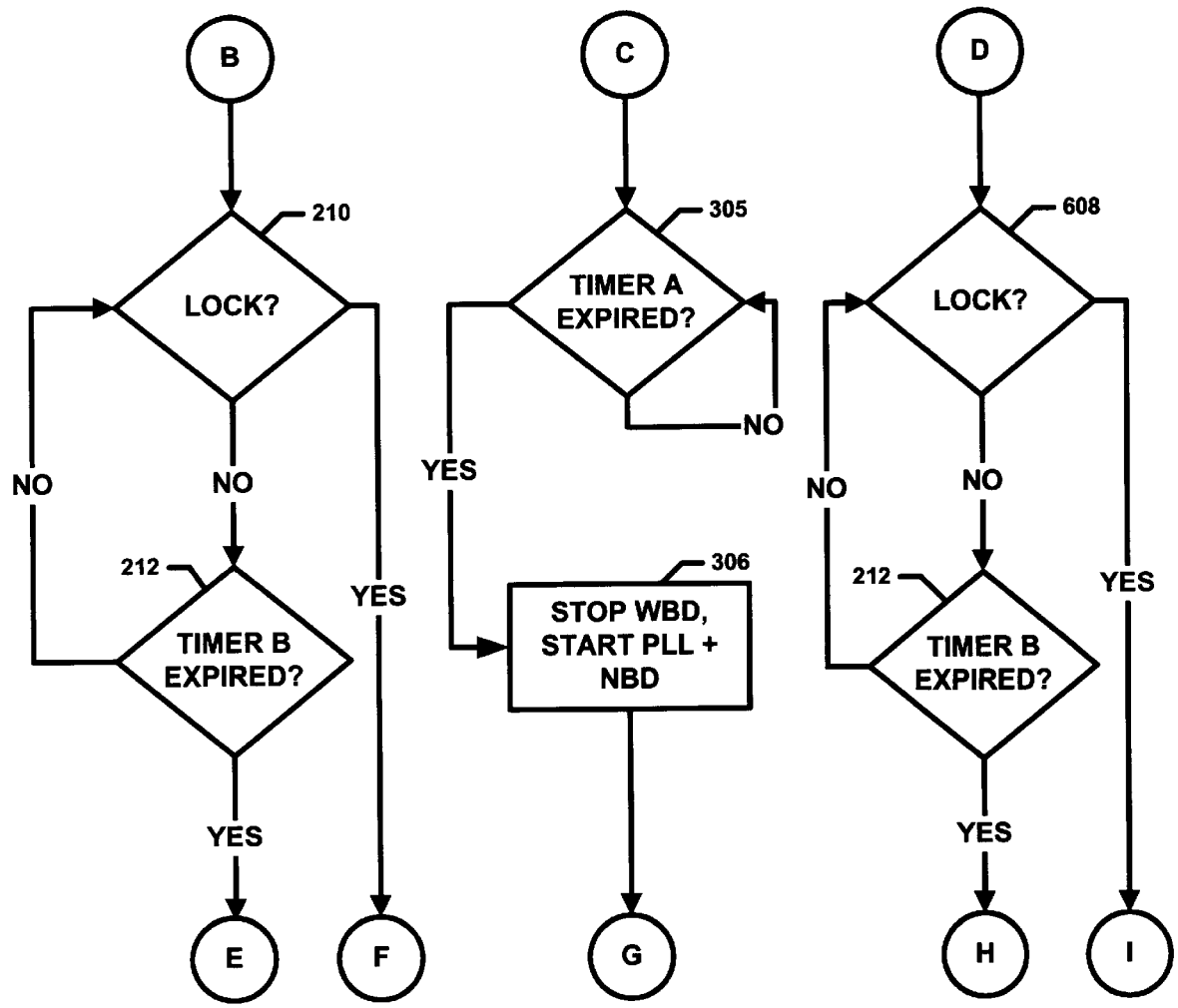
Figure 10C:
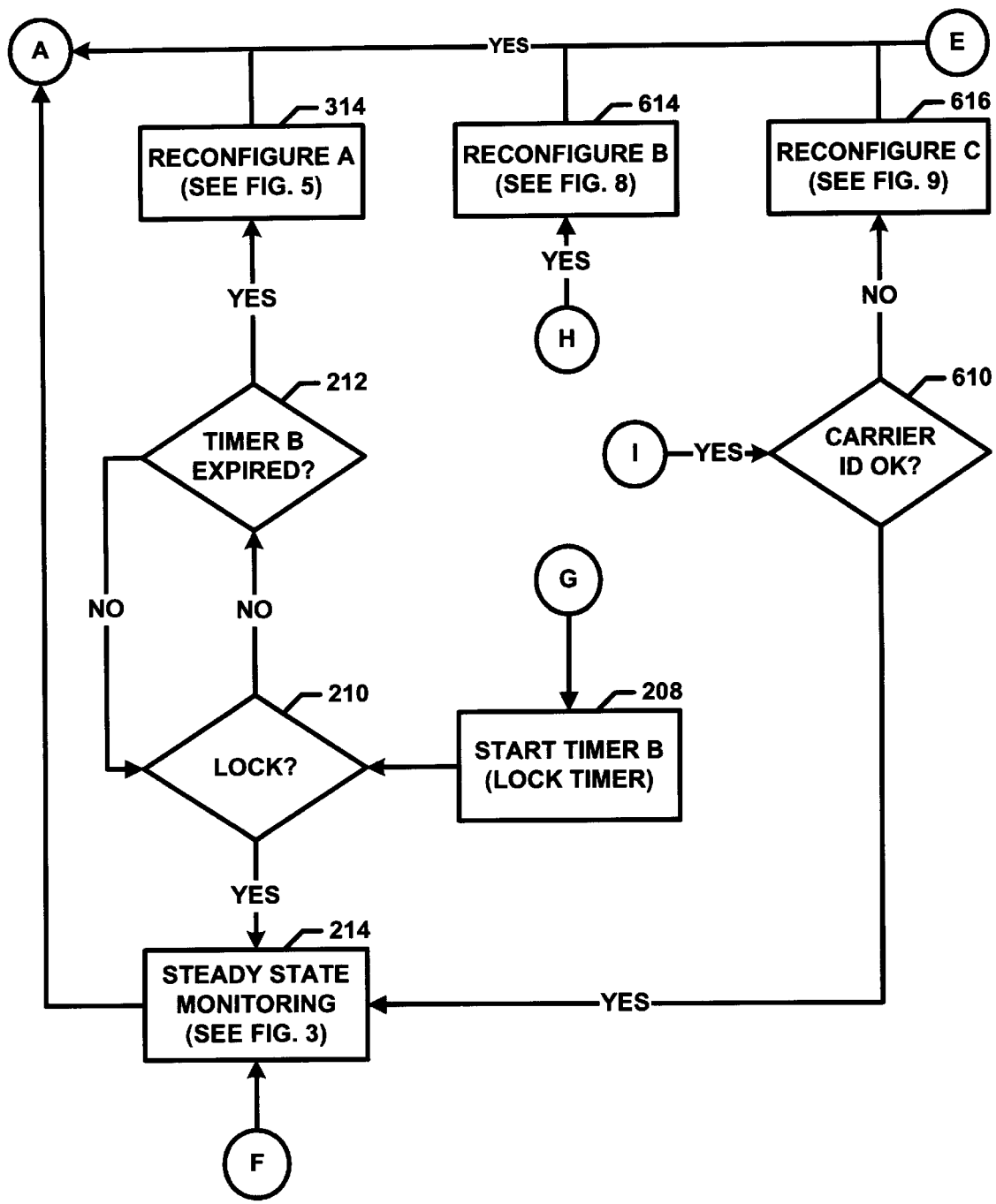

FIG. 10A–C: Illustrate the complete intelligent carrier acquisition method.

The narrow band carrier acquisition approach that gives the best performance is not the same in all circumstances. Therefore, optimal performance is only obtained when the narrow band satellite receiver can responsively and dynamically employ different methods in different circumstances, and the choice of method is made automatically based on the set of circumstances present at the moment. The present invention sets forth a method and a mechanism whereby this automatic selection of methods can be implemented.

The decision tree for dynamic selection of an optimal acquisition method will have many levels and branches, but the principle can be illustrated by a specific, successful implementation. In this implementation, a microprocessor controls the demodulator, or modem, used for the narrow band carrier acquisition.

Referring to FIG. 1, a typical configuration of a narrow-band satellite system of the present invention is illustrated. The system comprises a plurality of transmit and receive ground stations 10, which may be interlinked with network managers 12. Each ground station further comprises a microprocessor 14, which is interlinked with a software configurable modem 16, which is further interlinked with uplink, or transmit components 18 as well as downlink or receive components 20. The microprocessor 14 is configured to dynamically control the operating parameters of the receive side of the modem 16 through software commands. These changes in the modem operating parameters allow it to achieve lock to a received narrowband carrier. As an example in FIG. 1, the uplink data channel 22 of a first ground station is translated in frequency by the satellite 24 and becomes a downlink data channel 26 for a second ground station. The return data path from the second ground station includes an uplink data channel 28 which is also translated in frequency by the satellite and becomes a downlink data channel 30 for the first ground station.

To accomplish the carrier acquisition of the present invention, the microprocessor 14 receives configuration information from either a collocated "network manager," 12 or from the system control station 32 via a broadcast satellite channel 34. When the configuration information is passed from the system control station 32, it is first passed to the satellite 24 before entry on the broadcast satellite channel 34. The configuration information contains data values as stored in the system database.

Among other elements, the configuration information includes the following: narrow band carrier frequencies; user port data rate; FEC coding format; and modulation type. In addition, the configuration information includes information about the worst case frequency uncertainty of the narrow band carriers and recommendations on the acquisition method or submethod to employ. The information about the worst case frequency uncertainty relates to three defined cases of frequency uncertainty.

Case 1. Uncertainty is less than the acquisition range of the steady state tracking circuits. No search for the narrow band carrier is needed.

Case 2. Uncertainty is larger than in Case 1, but less than half the frequency difference between the desired narrow band carrier and its closest assigned neighbor. (The phase detector cannot by itself pull the loop into lock. Frequency acquisition is needed, but the modem will not lock to the wrong narrow band carrier.)

Case 3. Uncertainty is larger than half the distance to the closest assigned narrow band carrier. (Locking to the wrong narrow band carrier is possible.)

Referring to FIG. 2, the first decision point 202 regarding acquisition method selection is whether the circumstances conform to Case 1 described above. If the answer is no, then either case 2 or case 3 apply 203. If the answer is yes, a simple, quick acquisition method is followed.

Case 1: Small Frequency Uncertainty

In the simplest case, the narrow band carrier frequency to be acquired is known with high accuracy at the receiving ground station and the operating parameters are downloaded 204 to the modem. In modem satellite receivers, precision crystal time bases and direct digital synthesis of narrow band carrier frequencies allow accurate, software-controlled tuning, including a digital memory for the narrow band carrier frequency during periods of fades. Locking to the received narrow band carrier is possible with a phase lock loop (PLL) that tracks the narrow band carrier once the lock is obtained.

In order to enhance acquisition speed, an embodiment of the present invention makes use of a Narrow Band Discriminator (NBD) to reduce the lock-up time. As illustrated in FIG. 2, the NBD operates together with the narrow bandwidth PLL in the initial stages of the acquisition 206, but is shut down when the PLL is tracking in order to remove it as a source of phase noise for the PLL. This NBD is based upon the measurement of phase differences between successive symbols. To ensure that rapid acquisition is achieved, a lock timer starts 208 a countdown which results in the system logic flow back to the first decision point 202 in the event of timer expiration 212 without achieving lock 210. If lock 210 is achieved, the logic flow moves to steady state monitor of the link 214.

The lock range for the NBD augmented PLL is a function of its design. In digital implementations, the process of sampling the input signal introduce the possibility of "aliasing," a phenomenon well known to those involved with digital signal processing. In the present invention, aliasing will occur for Quadrature Phase Shift Keying (QPSK) modulation at $\frac{1}{8}$ the sampling rate, and $\frac{1}{4}$ the sampling rate for Bi-Phase Shift Keying (BPSK). The sampling rate for the NBD and PLL is set to one sample per symbol. Thus, in order to avoid aliasing, which can cause false lock, the narrow band carrier frequency error must be less than 12.5% of the symbol rate for QPSK and less than 25% for BPSK. To produce some margin against aliasing, the Case 1 acquisition method considers the maximum allowable possible narrow band carrier frequency error to be 5 and 10% of the symbol rate for QPSK and BPSK, respectively. This is a reasonable acquisition range for a narrow band carrier whose frequency is considered to be accurately known. The demodulator can lock up to a narrow band carrier in this range by using the NBD augmented PLL, and will then enter a state of steady state tracking, employing the PLL without the aid of the NBD.

Referring to FIG. 3, while in steady state tracking mode the receiver may lose the narrow band carrier due to a fade. If this occurs the narrow band carrier loss is sensed 102. A fade is a temporary local condition which may or may not be registered in the system database at the system control station, but which is used as one condition influencing the acquisition method selection at the local site. If narrow band carrier lock is lost, the last RF tuning value is placed in memory, and a "long fade" timer 104 is started. The length of the timeout period is adjustable according to software. As long as the timer has not expired 111, the narrow band carrier frequency is assumed to be the same as before the loss of lock. The phase lock loop 106 is kept running, allowing rapid relock when the narrow band carrier returns. The loop is kept from wandering off in frequency due to random noise by applying narrow digital frequency clamps 108 around the memorized last known RF value. If the narrow band carrier frequency is relocked 110, the system returns to steady state monitor to detect lost lock 102.

If the fade timer expires 111 without narrow band carrier lock having been reestablished 110, a new acquisition 112 is attempted. In this instance, referring again to FIG. 2, the system database is consulted 202 to see what conditions exist in terms of possible frequency errors and adjacent narrow band carriers. The information is continually updated at each ground station by transmissions from the system control station, where the database exists, describing the assigned narrow band carriers in terms of frequency, frequency tolerance, i.e., uncertainty, and narrow band carrier bandwidth. Two possible alternatives may be employed; (i) the system control station may transmit that basic information, leaving it to each ground station to compute the best acquisition approach for itself, or (ii) all computations may be performed at the system control station, with the results broadcast to the ground stations. If a Case 1 condition still exists, the demodulator is loaded with the appropriate operating parameters.

On this restart for Case 1, referring again to FIG. 2, the phase lock loop remains active, aided by the narrow band discriminator 206. Concurrently, a timer 208 is started to allow some time for the loop to lock before a failure to do so is declared. If a lock is detected 210 before the expiration of the timer, the timer and the NBD are disabled, and the demodulator enters the Steady State Tracking and Monitoring mode 214 illustrated in FIG. 3. If the timer expires without narrow band carrier lock being obtained the Case 1 initial acquisition 202 is attempted again.

In Case 1, the cause for a failure to lock may be that a narrow band carrier is not present, or is severely faded. If so, noise or the skirt of an adjacent narrow band carrier may pull the loop off the original starting point. The digital tuning is therefore clamped at offsets from the starting point equal to ±10% of the symbol rate for BPSK or ±5% of the symbol rate for QPSK. Restarting the attempt at the center is better than letting the loop drift to a clamp value until the expected narrow band carrier comes in with sufficient amplitude, because it allows faster acquisition of a narrow band carrier emerging from a fade, especially if the desired narrow band carrier has a frequency close to the opposite clamp.

Moderate Frequency Offsets (Case 2):

The second case is where the total frequency uncertainty is greater than half of the unaliased NBD range but less than half of the channel spacing. The channel spacing usually ranges from 1.0 to 2.0 times the symbol rate (typically 1.4).

Referring to FIG. 4, the system will first determine if a Case 2 frequency uncertainty exists 300. For Case 2 it is not possible for the NBD/PLL combination to unambiguously lock to the desired narrow band carrier, due to the false locking phenomenon. For this case, a wideband discriminator (WBD) 302 is used. The WBD can be implemented in a number of ways, such as an FFT calculation, or a "quadricorrelator," or any other means to rapidly find a rough measure of the frequency of a signal. In one embodiment of the present invention, a quadricorrelator is implemented, although an FFT is equally suitable as an alternative embodiment.

The WBD operates under the assumption that no adjacent narrow band carrier has significant energy in the frequency uncertainty band of the demodulator. The method for determining whether the circumstances are suitable for Case 2 involves a calculation based on (i) the known magnitude of the frequency uncertainty, and (ii) the known frequency, bandwidth and power of assigned narrow band carriers on either side of the desired narrow band carrier. In the calculation, the filter bandwidth is assumed to be the larger of 43% of the frequency uncertainty or 60% of the desired narrow band carrier symbol rate. The filter form factor is set for maximally steep slopes. The system database is then consulted to see whether any other narrow band carriers will have assigned frequencies and bandwidths sufficient to generate energy on the output of the baseband filter with these characteristics when the loop is tuned to approximately the correct frequency. If there are no known narrow band carriers assigned within those limits, and the nearest adjacent narrow band carrier frequency is further away than the frequency uncertainty of the desired narrow band carrier, the modem parameters 301 are loaded with the above filter values, and wideband frequency discriminator is triggered at the beginning of the acquisition sequence. The filter values for this instance are the larger of 43% of the frequency uncertainty or 60% of the desired narrow band carrier symbol rate. In Case 2, the composite frequency uncertainty is less than half the channel spacing; therefore, it is not possible for the clamped WBD to be pulled to an adjacent narrow band carrier. It is, however, possible that adjacent narrow band carriers could introduce a frequency bias.

The WBD is run once and covers a sufficiently wide frequency band that it will likely find the narrow band carrier in the first attempt. Using lock timer A 304, the WBD runs for a preselected number of symbols 305, calculated to give a high probability that the narrow band carrier loop is tuned sufficiently close for the PLL mechanism to achieve narrow band carrier lock. Then the PLL/NBD method 306 takes over, similar to the Case 1 method. At this point in the logic, the matched filter bandwidth is changed to the optimal for the narrow band carrier symbol rate and lock time B is started 308.

The lock status 210 of the NBD augmented PLL is monitored by the modem microprocessor. In the absence of adjacent channel interferers, the WBD will reduce the frequency uncertainty and the NBD/PLL will lock 210. If adjacent channel interferers are present, the WBD will most likely be biased, but in most cases, the coarse tuning via the WBD brings the loop close enough to the received narrow band carrier to subsequently lock 310 via the NBD/PLL method.

In some cases, the WBD may fail to reduce the frequency uncertainty to within the NBD range. If the lock timer expires 212 without successful narrow band carrier acquisition, a "Reconfiguration A" subroutine 314 is initiated.

Referring to FIG. 5, the reconfiguration A subroutine automatically restarts the acquisition attempt, and begins the new attempt at a new starting frequency, offset from the previous starting frequency. The first reconfiguration A cycle finds that the initial $\Delta f$ in the failed acquisition attempt was equal to 0 400. This finding causes the controlling microprocessor to set to "1" a flag bit as the "offset flag" 404.

In FIG. 5, $\Delta f$ is a variable that is incremented, decremented or set to some specific value as indicated by the logic in the flow charts. $\Delta f$ remains as the last set value until modified by a subsequent action explicitly shown in the flow charts. $\Delta f_{max}$ indicates a clamp value that cannot be exceeded in the lock attempt by the WBD or PLL/NBD, and is equal to the magnitude of the frequency uncertainty of the desired narrow band carrier.

For example, assume that while it was running in the initial acquisition attempt, the WBD caused the loop to be pulled off the initial frequency by some amount, but the direction of the pull did not cause the desired narrow band carrier to appear in the filter bandwidth. In all likelihood, the desired narrow band carrier is present on the other side of the initial starting frequency, and a retuning of the loop in that direction is the best strategy. (See FIG. 6, step 2) The amount of retuning is 0.43 times the frequency uncertainty away from the initial starting frequency 406 or 408 depending on direction of the pull, i,e., is the pull ≧0414 and the direction is opposite from that caused by the WBD. If the desired narrow band carrier is indeed present on that side of the initial loop tuning frequency, most of its energy is certain to fall in the passband of the filter. (See FIG. 6, step 3)

If for some reason the loop fails to lock with the new starting frequency, the subsequent reconfiguration A cycle finds that the offset flag is set. The controlling microprocessor then sets the offset to the same magnitude value as for the preceding acquisition attempt, but with the opposite sign 410. It also resets the offset flag. This will step the starting frequency through three values in repeated attempts to acquire the narrow band carrier: 0, and ±0.43* $\Delta f_{max}$. (412, 406 and 408). Note that even though the starting frequency is given an offset, the clamp values for the loop tuning are not changed. The WBD will therefore not pull the loop outside of the band of frequency uncertainty. If, after a fade, the expected carrier appears within this band, the PLL/NBD will lock to it.

A scan counter 418 monitors the number of times the WBD has gone through the three step tuning scan. If the number reaches a preset value 416 without successful acquisition, the Case 2 acquisition method is abandoned 420, and a Case 3 approach is initiated. The counter value for when this action is taken is set by the network manager as a system configuration parameter. The scan counter 418 is reset when a narrow band carrier lock is finally achieved.

Referring to FIG. 6, in a first wide band discriminator acquisition attempt, a low bit rate narrow band carrier received with a large frequency uncertainty could leave most of the energy of the desired narrow band carrier 502 outside of the filter 506, which has a bandwidth of only 43% of the frequency uncertainty. However, when the loop is retuned by 43% of the frequency uncertainty, the center of the desired narrow band carrier will fall inside the filter bandwidth, and acquisition can take place. The 43% filter bandwidth is chosen to eliminate most of the energy of a narrow band carrier spaced away from the desired one by twice the frequency uncertainty, given a worst case initial frequency error in the loop. Even a strong narrow band carrier will not be able to overcome the signal from the desired narrow band carrier if the latter is inside the filter bandwidth.

FIG. 6 shows how the retuning of the loop allows the desired narrow band carrier to enter the bandwidth of the filter following an initial failed acquisition attempt. The initial attempt failed because the desired narrow band carrier 502 was narrow enough to fall outside the filter bandwidth 506 (having initial tuning frequency 501) due to a frequency uncertainty 503 and 505 much larger than the symbol rate. (Widening the filter bandwidth does not help, because the wrong narrow band carrier 504 will dominate the energy in the filter passband.) The loop tuning initially drifts toward the wrong narrow band carrier 508, and its energy appears in the filter output 510. The WBD then quickly pulls the loop toward that narrow band carrier. However, Case 2 assumes that the wrong narrow band carrier is centered outside the band of frequency uncertainty 503 and 505. The loop tuning clamps, set at these limits, will therefore prevent the loop from locking to the wrong narrow band carrier. The WBD timer and the lock timer will expire without lock being achieved, triggering the Reconfigure A subroutine. The loop is restarted with an offset in the opposite direction 512 from where the WBD pulled it, and that brings the correct narrow band carrier 514 into the filter bandwidth, but the filter has high attenuation for the signal from the wrong narrow band carrier. The WBD will quickly pull the loop toward the correct narrow band carrier, where the NBD and PLL will subsequently lock to it. Referring again to FIG. 4, when the WBD is halted and the NBD/PLL combination takes over, the filter bandwidth is reduced to the optimum matched filter value 306. A PLL lock indication 210 causes the NBD to be disconnected.

Referring again to FIG. 4, once the correct narrow band carrier has been acquired, and the modem has entered the steady state tracking mode 214, it will know the narrow band carrier frequency with high accuracy. Unless the demodulator has been shut down for some period of time, the digital memory will then be used to classify the frequency uncertainty as Case 1, and acquisition will be rapid.

Large Frequency Offsets (Case 3):

Referring to FIG. 7, the final case occurs where the total frequency uncertainty is greater than half the channel spacing. The WBD is of little value in this situation, because there may be several narrow band carriers within the viewing bandwidth. Further, it is necessary to search over a wider frequency range than either the 5% of the symbol rate for QPSK, or the 10% of the symbol rate for BPSK allowed by the NBD, in addition to avoiding lock to an adjacent channel. The search is done by stepwise scanning across the band, using the NBD augmented PLL.

After download of the receiver parameters 602, start of the PLL and NBD 604, and start of the timer B lock timer 208, the demodulator may lock 210 to a narrow band carrier on the first attempt, but adjacent channels may have exactly the same characteristics as the desired narrow band carrier channel, causing the demodulator to lock to the wrong channel. It is therefore necessary to identify 610 the correct channel following a lock indication. An overhead channel multiplexed into the data stream in each channel serves this purpose. With an overhead channel, the receiver may verify that it is locked to the correct channel by decoding a frequency identity message via the overhead channel. If this message has the incorrect frequency code, the receiver knows that it has locked to the wrong channel and will retry at the correct frequency, since it now knows the exact frequency uncertainty. If the message is invalid, the receiver performs a reconfiguration submethod "C"616 and tries again at one channel spacing away from the incorrect channel.

Thus, if the demodulator locks to the correct narrow band carrier in the first attempt, the demodulator enters the steady state tracking mode 214. If it fails to lock at all before the timer expires, it executes reconfiguration submethod "B"614.

Referring to FIG. 8, reconfiguration submethod "B" is described. Repeated failures to lock lead to repeated re-configurations and re-attempts, each time with a new step (702 or 704) in the starting frequency. The proper step (702 or 704) is selected based on whether the desired narrow band carrier is BPSK or QPSK 700. The demodulator keeps stepping progressively alternatively above and below the nominal frequency until the difference reaches the maximum frequency uncertainty 706 reported from the system control database. Then the demodulator restarts the stepping process 708. This sequence continues until narrow band carrier lock is obtained 710. If a narrow band carrier of the correct type exists within the frequency band searched by this process, acquisition is eventually achieved.

Referring again to FIG. 7, when a lock is obtained, the acquired narrow band carrier may not be the correct one since the frequency uncertainty was greater than half the distance between active narrow band carriers. In the example embodiment of the present invention, if the incorrect narrow band carrier is locked, an alternative reconfiguration, submethod "C," is implemented 616.

Referring to FIG. 9, reconfiguration submethod "C" is illustrated. The identity of the received narrow band carrier is contained in the overhead channel in the form of a packet message every few seconds, indicating the nominal RF frequency of the narrow band carrier. As soon as the PLL locks 800 to a narrow band carrier, a timer is started 802 and the receiving microprocessor attempts to extract the overhead channel 804 from the received signal. If the acquired narrow band carrier has the same overhead format and rate as the desired channel, meaningful messages are successfully extracted 806. As soon as a valid frequency message is received, the microprocessor checks if the frequency value corresponds to the frequency of the desired narrow band carrier 808. If so, the system generates a lock confirmation signal 810 which causes the modem to enter the steady state monitoring mode (See FIG. 3, 110).

If the frequency message indicates the wrong narrow band carrier has been acquired, the microprocessor calculates the amount of tuning error 812 present relative to the tuning needed for the correct narrow band carrier. It then issues the correct frequency value 814 to the tuning circuits and issues a reconfiguration command 816.

If no valid frequency message is extracted from the narrow band carrier before the timer expiration, 820 the microprocessor simply steps the tuning frequency value by one channel spacing 818, and then issues the reconfiguration command 816. This allows for a mixture of narrow band carriers with and without an overhead channel and/or the frequency value in their overhead channel.

Note that once the correct narrow band carrier has been acquired and the modem has entered the steady state tracking mode, the microprocessor will retain the correct narrow band carrier frequency with high accuracy. Unless the modem is shut down for some period of time, the digital memory can classify the frequency uncertainty as Case 1, allowing rapid acquisition.

Complete Intelligent Carrier Acquisition Method

FIGS. 10A–C illustrate the complete intelligent carrier acquisition method of the present invention, showing the composite of the methods and submethods for the three different cases of frequency uncertainty, as described above.

We claim:

1. A method for acquiring and tracking communication channels in a satellite communication system:

transmitting communication operating parameter information from a system control station to a satellite communication system comprising a plurality of ground stations;

collecting the transmitted communication operating parameter information from the satellite communication system;

storing the communication operating parameter information from the satellite communication system;

distributing the communication operating parameter information to at least one of the plurality of ground stations in the satellite communication system acquiring a desired communication channel by selecting one of a plurality of acquisition submethods, wherein the selection of the particular acquisition submethod is based on the communication operating parameter information;

configuring a software configurable modem using the communication operating parameter information; and tracking the desired communication channel.

2. The method for acquiring and tracking communication channels in a satellite communication system of claim 1 wherein the communication operating parameter information from the satellite communication system further comprises:

carrier frequency of the desired communication channel;

carrier frequency uncertainty of the desired communication channel;

operating parameters of other communication channels within a frequency acquisition range;

bandwidth of the desired communication channel;

symbol rate of the desired communication channel;

modulation type of the desired communication channel; and coding rate of the desired communication channel.

3. The method for acquiring and tracking communication channels in a satellite communication system of claim 1 wherein the tracking of the desired communication channel further comprises:

detecting a lost lock of the desired communication channel;

starting a long fade timer upon detecting the lost lock of the desired communication channel;

clamping and storing the last frequency of the desired communication upon detecting the lost lock of the desired communication channel;

applying a phase lock loop to relock the desired communication using the stored frequency; and performing an acquisition restart upon expiration of the long fade timer if the relock of the desired communication channel is not accomplished.

4. The method for acquiring and tracking communication channels in a satellite communication system of claim 2, wherein selecting an acquisition submethod further comprises:

selecting a first acquisition submethod if the carrier frequency uncertainty of the desired communication channel is less than the acquisition range of the tracking circuits;

selecting a second acquisition submethod if the carrier frequency uncertainty of the desired communication channel is greater than in the first acquisition submethod and less than one half the carrier frequency difference between the desired communication channel and its nearest other communication channel; and selecting a third acquisition submethod if the carrier frequency uncertainty of the desired communication channel is greater than one half the carrier frequency difference between the desired communication channel and its nearest other communication channel.

5. The method for acquiring and tracking communication channels in a satellite communication system of claim 4, wherein the first acquisition submethod further comprises:

downloading the communication operating parameters to the plurality of ground stations;

starting a phase lock loop and narrow band detector;

starting a lock timer;

determining whether the phase lock loop and narrow band detector have achieved communication channel lock;

tracking the desired communication channel if lock is detected by the lock detector; and staring requisition if the lock timer expires without lock detection by the lock detector.

6. The method for acquiring and tracking communication channels in a satellite communication system of claim 4, wherein the second acquisition submethod further comprises:

downloading the communication operating parameters to the plurality of ground stations;

starting a wide band detector;

starting a first lock timer;

stopping the wide band detector upon expiration of the first lock timer;

starting a phase lock loop and narrow band detector after stopping the wide band detector;

starting a second lock timer;

determining whether the phase lock loop and narrow band detector have achieved communication channel lock;

tracking the desired communication channel if lock is detected by the lock detector; and starting requisition with a first reconfiguration if the second lock timer expires without lock detection by the lock detector.

7. The method for acquiring and tracking communication channels in a satellite communication system of claim 4, wherein the third acquisition submethod further comprises:

downloading the communication operating parameters to the plurality of ground stations;

staring a phase lock loop and a narrow band detector;

starting a first lock timer;

determining whether the phase lock loop and narrow band detector have achieved communication channel lock;

determining whether the desired communication channel is locked;

tracking the desired communication channel if the correct channel is locked;

starting requisition with a second reconfiguration if the first lock timer expires without lock; and starting requisition with a third reconfiguration if the wrong carrier is locked.

8. A system for acquiring and tracking communication channels in a satellite communication system comprising:

a plurality of ground stations capable of receiving and transmitting information, wherein each ground station comprises a software configurable modem and a microprocessor connected to the software configurable modem, wherein each microprocessor further comprises a plurality of carrier acquisition submethods;

a system control station comprising a database further comprising communication operating parameters for ground stations to receive information using a narrow band carrier on a desired communication channel;

at least one satellite comprising a link to the system control station to obtain the communication operating parameters for the receiving ground stations and a link to at least one receiving ground station; and wherein the microprocessor of at least one ground station receiving information uses the communication operating parameters for configuring software configurable modem and for selecting one of the acquisition submethods to acquire and lock on the narrow band carrier of the desired communications channel.

9. The system for acquiring and tracking communication channels in a satellite communication system of claim 8 wherein the communication operating parameters further comprise:
- carrier frequency of the desired communication channel;
- carrier frequency uncertainty of the desired communication channel;
- operating parameters of other communication channels within a frequency acquisition range;
- bandwidth of the desired communication channel;
- symbol rate of the desired communication channel;
- modulation type of the desired communication channel; and
- coding rate of the desired communication channel.

10. The system for acquiring and tracking communication channels in a satellite communication system of claim 9 wherein each of the plurality of ground stations further comprises:
- an uplink terminal connected to the software configurable modem;
- a downlink terminal connected to the software configurable modem;
- software on the microprocessor for controlling the tuning characteristics of the uplink and downlink terminals;
- tracking circuitry for monitoring the communication channel of the uplink and downlink terminals;
- a first acquisition submethod, wherein the carrier frequency uncertainty of the desired communication channel is less than the acquisition range of the tracking circuits;
- a second acquisition submethod, wherein the carrier frequency uncertainty of the desired communication channel is greater than in the first acquisition submethod but less than one half the carrier frequency difference between the desired communication channel and its nearest other communication channel; and
- a third acquisition submethod, wherein the carrier frequency uncertainty of the desired communication channel is greater one half the carrier frequency difference between the desired communication channel and its nearest other communication channel.

11. The system for acquiring and tacking communication channels in a satellite communication system of claim 10 wherein the microprocessor further comprises:
- instructions for detecting a lost lock of the desired communication channel;
- instructions for starting a long fade timer upon detecting the lost lock of the desired communication channel;
- instructions for clamping and storing the last frequency of the desired communication channel upon detect the lost lock of the desired communication channel;
- instructions for applying the phase lock loop to relock the phase lock loop using the last frequency of the desired communication channel; and
- instructions for performing an acquisition restart upon expiration of the long fade timer if relock of the desired communication channel is not accomplished.

12. The system for acquiring and tracking communication channels in a satellite communication system of claim 10 wherein the first acquisition submethod further comprises:
- instructions for downloading the communication operating parameters to the plurality of ground stations receiving the information;
- a phase lock loop;
- a narrow band detector;
- instructions for starting the phase lock loop and narrow band detector;
- a lock timer;
- instructions for starting the lock timer;
- instructions for determining if the phase lock loop and narrow band detector have achieved communication channel lock;
- instructions for tracking the desired communication channel if a lock is achieved; and
- instructions for starting requisition if the lock timer expires without achieving lock detection.

13. The system for acquiring and tracking communication channels in a satellite communication system of claim 10 wherein the second acquisition submethod further comprises:
- instructions for downloading the communication operating parameters to the plurality of ground stations receiving the information;
- a wide band detector;
- instructions for starting the wide band detector;
- a first lock timer;
- instructions for starting the first lock timer;
- instructions for stopping the wide band detector upon expiration of the first lock timer;
- a phase lock loop;
- a narrow band detector;
- instructions for starting the phase lock loop and narrow band detector;
- a second lock timer;
- instructions for starting the second lock timer;
- instructions for determining if the phase lock loop and narrow band detector have achieved communication channel lock;
- instructions for tracking the desired communication channel if a lock is achieved; and
- instructions for starting requisition with a first reconfiguration if the second lock timer expires without achieving lock detection.

14. The system for acquiring and tracking communication channels in a satellite communication system of claim 10 wherein the third acquisition submethod further comprises:
- instructions for downloading the communication operating parameters to the plurality of ground stations receiving the information;
- a phase lock loop;
- a narrow band detector;
- instructions for starting the phase lock loop and narrow band detector;
- a first lock timer;
- instructions for starting the first lock timer;
- instructions for determining if the phase lock loop and narrow band detector have achieved communication channel lock;
- instructions for determining if the desired communication channel is locked;
- instructions for tracking the desired communication channel if the correct channel is locked;
- instructions for starting requisition with a second reconfiguration if the first lock timer expires without achieving lock detection; and instructions for starting requisition with a third reconfiguration if the wrong carrier is locked.

15. The method for acquiring and tracking communication channels in a satellite communication system of claim 6, wherein the first reconfiguration further comprises stepping sequentially through three changes to the value of a starting frequency at corresponds to zero, plus forty three percent of the frequency uncertainty and minus forty three percent of the frequency uncertainty.

16. The method for acquiring and tracking communication channels in a satellite communication system of claim 7, wherein the second reconfiguration comprises stepping a test frequency progressively and alternatively above and below the desired communication channel frequency until the difference between the desired communication channel frequency and the test frequency reaches the frequency uncertainty.

17. The method for acquiring and tracking communication channels in a satellite communication system of claim 7, wherein the third reconfiguration comprises:

staring a timer;

attempting to extract information from the channel;

generating a lock signal if the extracted information matches the parameters of the desired communication channel;

calculating the frequency error of the locked channel and stepping by that error if the wrong communication channel is locked; and stepping by one channel spacing if the timer expires and no information is extracted from the channel.

18. The system of claim 13, wherein the first reconfiguration further comprises instructions for sequentially stepping trough three changes to the value of a starting frequency that corresponds to zero, plus forty three percent of the frequency uncertainty and minus forty three percent of the frequency uncertainty.

19. The system of claim 14, wherein the second reconfiguration further comprises instructions for stepping a test frequency progressively and alternatively above and below the desired communication channel frequency until the difference between the desired communication channel frequency and the test frequency reaches the frequency uncertainty.

20. The system of claim 14, wherein the third reconfiguration further comprises:

a timer;

instructions for starting the timer;

instructions for attempting to extract information from the channel;

instructions for generating a lock signal if the extracted information matches the parameters of the desired communication channel;

instructions for calculating the frequency error of the locked channel and stepping by that error if the wrong communication channel is locked; and instructions for stepping by one channel spacing if the timer expires and no information is extracted from the channel.

* * * * *